United States Patent [19]

Hara

[11] Patent Number: 5,781,175
[45] Date of Patent: Jul. 14, 1998

[54] IMAGE SEARCH APPARATUS

[75] Inventor: Hiroyuki Hara, Yokohama, Japan

[73] Assignee: Canon Kabushiki Kaisha, Tokyo, Japan

[21] Appl. No.: 701,455

[22] Filed: Aug. 22, 1996

Related U.S. Application Data

[63] Continuation of Ser. No. 247,414, May 23, 1994, abandoned, which is a continuation of Ser. No. 747,472, Aug. 13, 1991, abandoned, which is a continuation of Ser. No. 355,116, May 18, 1989, abandoned, which is a continuation of Ser. No. 38,239, Apr. 14, 1987, abandoned.

[30] Foreign Application Priority Data

| Apr. 21, 1986 | [JP] | Japan | 61-91671 |
| Apr. 21, 1986 | [JP] | Japan | 61-91672 |
| Apr. 21, 1986 | [JP] | Japan | 61-91673 |

[51] Int. Cl.$^6$ ............................................. G09G 5/00
[52] U.S. Cl. ........................... 345/127; 395/779; 395/603
[58] Field of Search ............................. 395/603, 779; 345/127

[56] References Cited

U.S. PATENT DOCUMENTS

| 4,408,301 | 10/1983 | Iida | 340/724 |
| 4,533,910 | 8/1985 | Sukonick et al. | 340/724 |
| 4,601,003 | 7/1986 | Yoneyama et al. | 340/790 |
| 4,618,858 | 10/1986 | Belch | 340/724 |
| 4,642,790 | 2/1987 | Minshull et al. | 340/724 |
| 4,663,615 | 5/1987 | Hernandez et al. | 340/724 |
| 4,692,757 | 9/1987 | Tsuhara et al. | 340/724 |
| 4,701,752 | 10/1987 | Wang | 340/724 |
| 4,736,199 | 4/1988 | Chadwick et al. | 340/721 |

FOREIGN PATENT DOCUMENTS

| 58-11427 | 1/1983 | Japan . |
| 58-87660 | 5/1983 | Japan . |
| 60-39170 | 2/1985 | Japan . |
| 60-254963 | 12/1985 | Japan . |
| 61-36868 | 2/1986 | Japan . |
| 62-227260 | 10/1987 | Japan . |

*Primary Examiner*—Mark R. Powell
*Attorney, Agent, or Firm*—Fitzpatrick, Cella, Harper & Scinto

[57] ABSTRACT

An image search apparatus includes a memory for storing plural sets of images, each set of the plural sets of images comprising one page image or plural page images, a display unit for displaying an image, and a control unit for controlling the display of the plural sets of images stored in the memory in reduced size on the display unit at a time, the control unit being capable of displaying desired pages of the said plural sets of images in reduced size.

19 Claims, 10 Drawing Sheets

IMAGE SEARCH APPARATUS

This application is a continuation of application Ser. No. 08/247,414, filed May 23, 1994, which is a continuation of application Ser. No. 07/747,472, filed Aug. 13, 1991, which is a continuation of application Ser. No. 07/355,116, filed May 18, 1989, which is a continuation of application Ser. No. 07/038,239, filed Apr. 14, 1987, now all abandoned.

BACKGROUND OF THE INVENTION

1. Field of the Invention

The present invention relates to an image search apparatus.

2. Related Background Art

A conventional apparatus wherein images of a plurality of pages of a document are displayed at one time in reduced size to search a desired image, is disclosed in Japanese Patent Laid-open Publication No. 254963/1985 by the same applicant.

Another conventional apparatus wherein images of a plurality of first pages or cover pages of documents are displayed at one time in reduced size to search a desired image, is disclosed in Japanese Patent Laid-open Publication No. 70515/1986 by the same applicant.

However, if a page or document having a desired image cannot be identified beforehand, it takes a long time to search it since the images on a screen must be checked one page after another until the objective image is found.

SUMMARY OF THE INVENTION

An object of the present invention is to eliminate the above disadvantage.

Another object of the present invention is to improve an image search method.

A further object of the present invention is to provide an image search apparatus capable of efficiently searching for a desired image even if the document or page having the desired image cannot be identified beforehand.

Other objects of the present invention will become apparent from the following description and claims when considered in connection with the accompanying drawings.

DETAILED DESCRIPTION OF THE PREFERRED EMBODIMENTS

The embodiments of the present invention will be described in detail with reference to the accompanying drawings.

Figure 1:
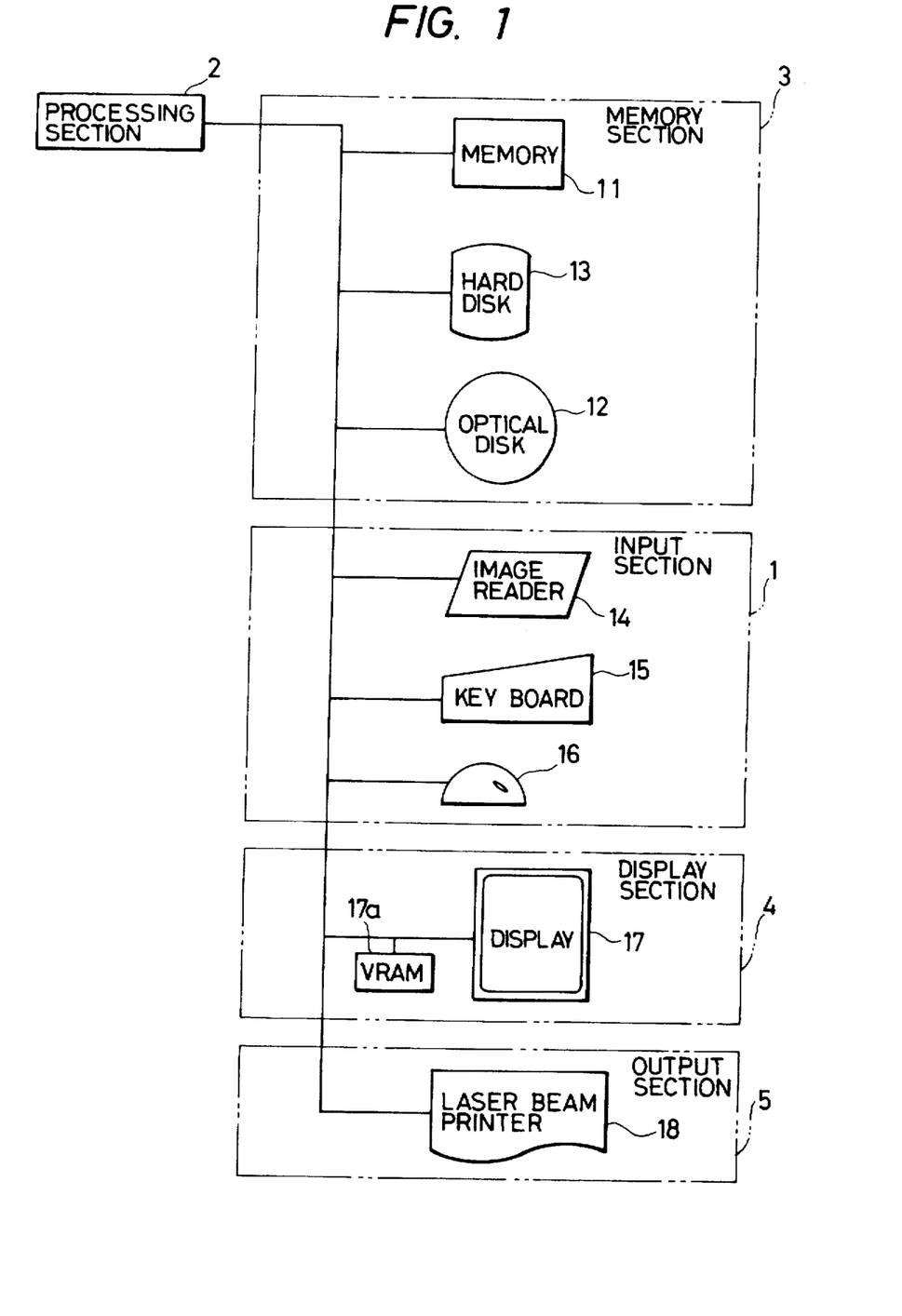
FIG. 1 is a block diagram showing an embodiment of the image search apparatus according to the present invention.

FIG. 1 is a block diagram of an embodiment of the image search apparatus according to this invention.

The image search apparatus comprises an input section 1 for input of image data and operation commands, a processing section 2 constructed of CPU, ROM and RAM for controlling the system and processing data, a memory section 3 for storing information such as document information inputted from the input section 1, a display section 4 for displaying information such as document information inputted from the input section 1 or process results, and an output section 5 for outputting data processed by the processing section 2.

A memory 11 in the memory section 3 temporarily stores document image data stored in an optical disk 12 and record information (management and search information) stored in a hard disk 13. An image reader 14 in the input section 1 reads document images and converts them into digital signals to store them in the optical disk 12. A keyboard 15 is used for inputting document search key words, data processing commands and character data.

A pointing device PD 16 is used for inputting coordinate information of a display 17 such as a CRT. A memory (VRAM) 17a is used for storing images displayed on the display 17. A laser beam printer 18 is used for producing images of high resolution. Key words and management information for document search are stored in the hard disk 13 in the form of records. The optical disk 12 stores a number of documents and image data which cannot be re-written.

Figure 2:
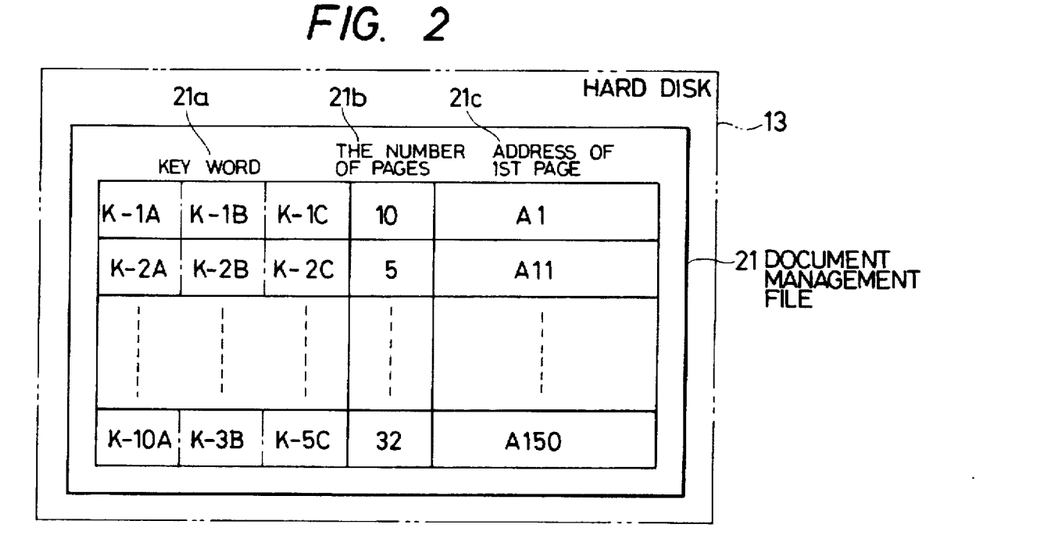
FIGS. 2 and 3 are memory maps of a hard disk.
Figure 3:
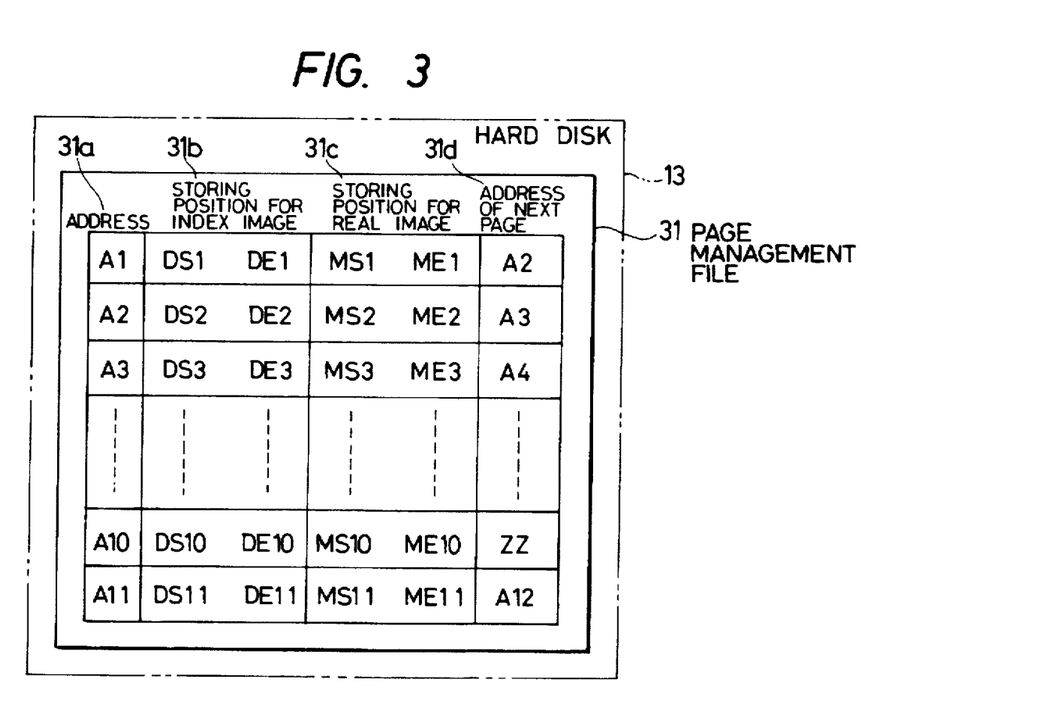

FIGS. 2 and 3 illustrate the file structure of the hard disk 13.

In FIG. 2, a document management file 21 stores key words 21a, the numbers of pages 21b and first page addresses 21c. Key words given to documents are stored in the area of key word 21a. Record addresses of first pages of a page management file 31 (shown in FIG. 3) which stores page management information of a document are stored in the area of first page address 21c.

In FIG. 3, the page management file 31 stores page addresses 31a, index image storing positions 31b, real image storing positions 31c, and next page chain addresses 31d. An index image means an image of a part or whole of a real image reduced by a fixed ratio. In the page management file 31, one record is composed of a page address 31a, index image storing positions 31b, real image storing positions 31c and a next page address 31d. A record manages one page information of a document. The index and real image storing positions 31b and 31c indicate the addresses of the reduced page image and the real page image stored in the optical disk 12, respectively, the addresses identifying the top and last sectors of an image.

If a next page exists, the next page chain address 31d indicates the address of a record in which the next page information is stored. The content "ZZ" of the chain address 31d represents that there is no next page, i.e., the record indicates the last page information.

FIGS. 4 to 7 are views used for explaining the operation of this embodiment.

Figure 4:
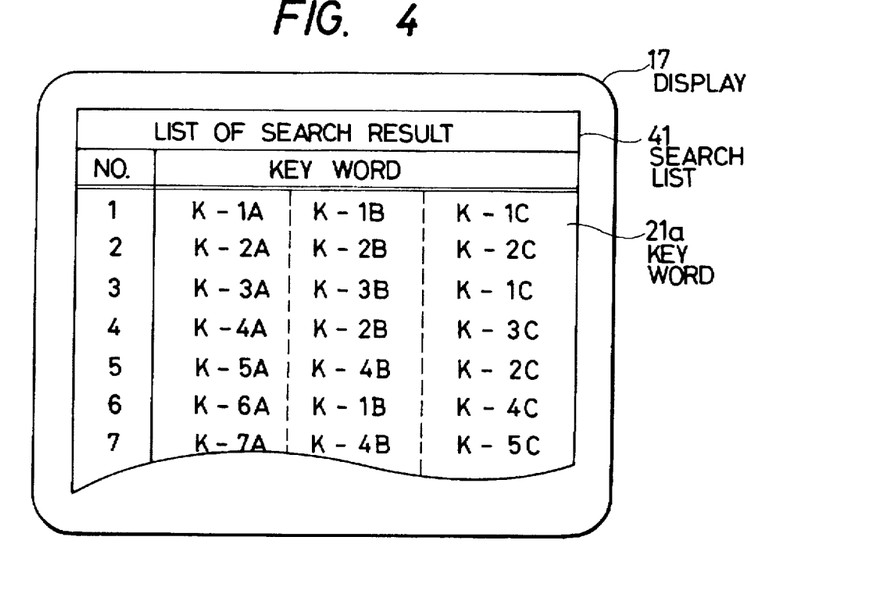
FIG. 4 shows a display example of a search result list.

Referring to FIG. 4, key words 21a of a searched document are sequentially displayed in a search result list 41.

Figures 5, 6:
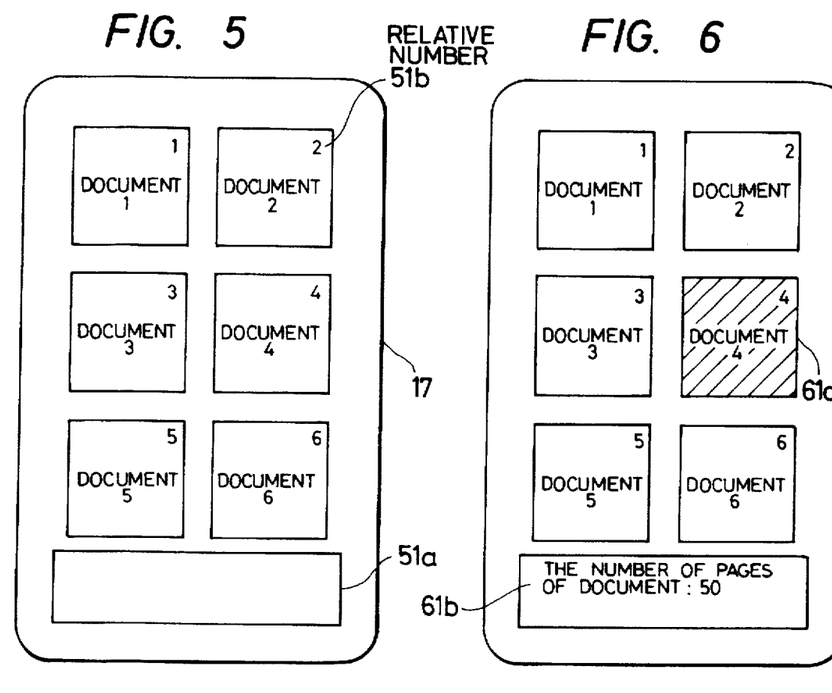
FIGS. 5 to 8 are views used for explaining the operation of the apparatus.

A guidance area 51a of FIG. 5 displays a next instruction or alarm message to the operator. Index images of first pages of documents 1 to 6 are shown in FIG. 5 (this display is referred to as "image index" hereinafter). Reference number 51b denotes a relative number displayed in the search result list (FIG. 4) which was displayed before the index images of FIG. 5. In this embodiment, six index images can be displayed on the screen at a maximum.

Referring to FIG. 6, after the document 4 is selected, a reverse index image 61a thereof is displayed. The number of pages of the selected document is displayed in the area 61b. The reversal of a document is achieved by inverting the state of each pixel.

Figure 7:
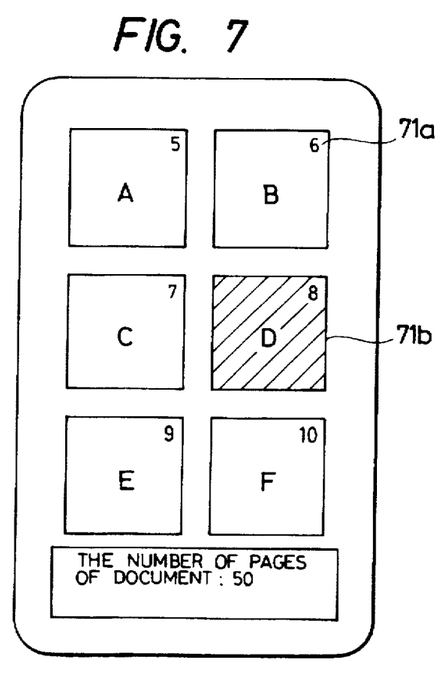

In FIG. 7, reference numeral 71a denotes the page of the document. After the image at page 8 is selected, a reverse index image 71b thereof is displayed.

Figure 8:
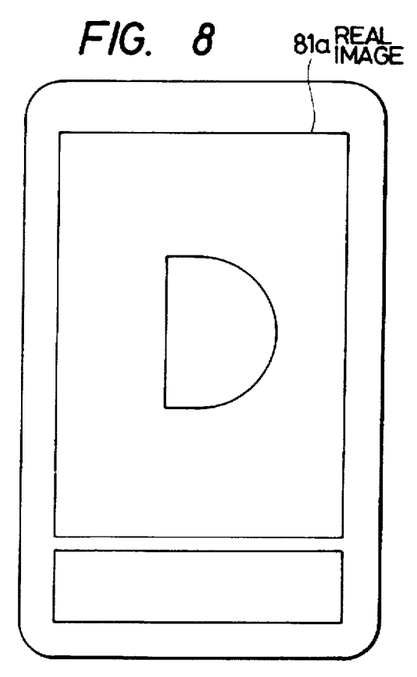

In FIG. 8, reference numeral 81a denotes a selected real image at page 8.

Next, the operation of the embodiment will be described.

Figure 9:
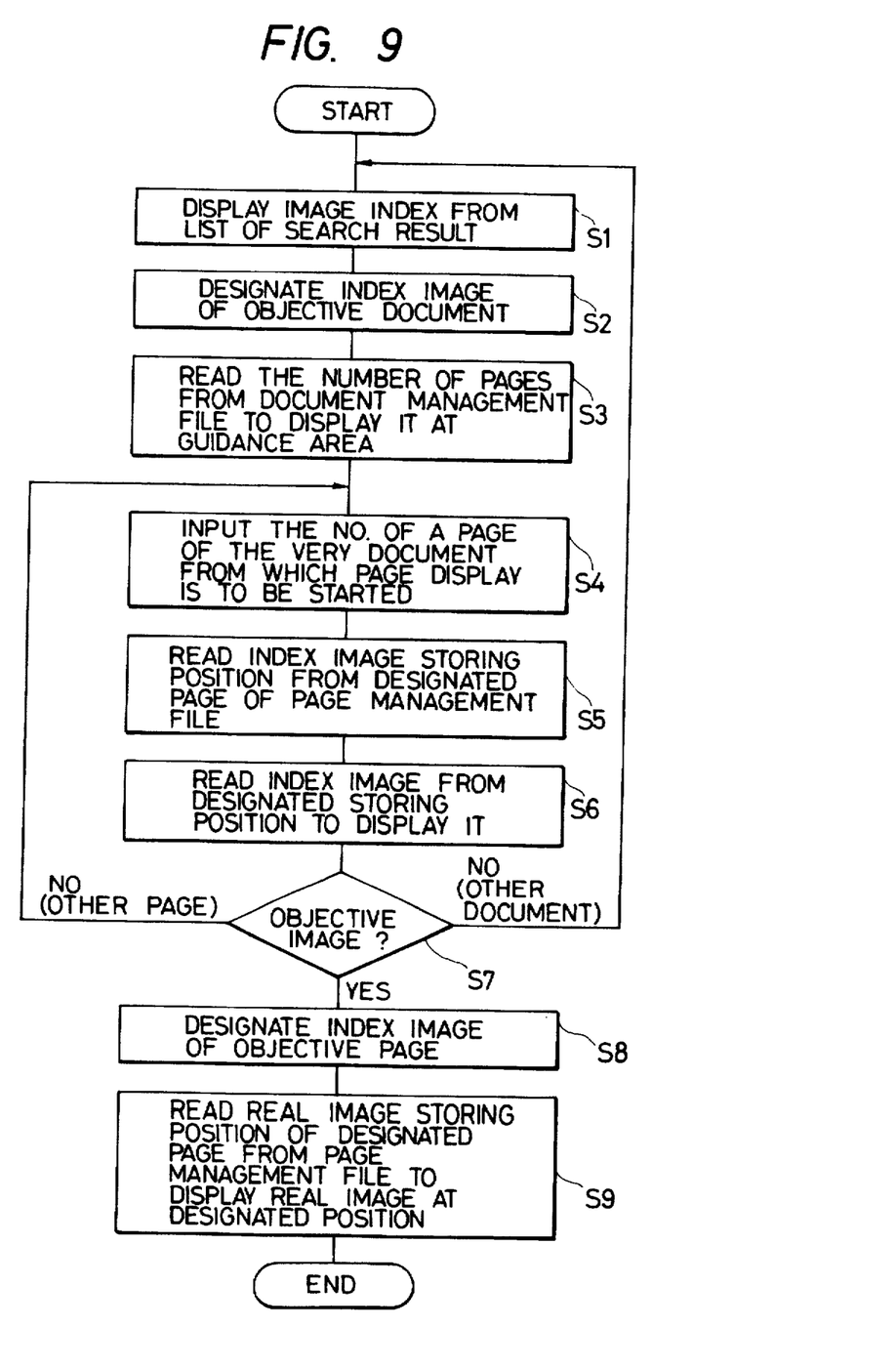
FIG. 9 is a flow chart for explaining the operation of displaying index images.

FIG. 9 is a flow chart illustrating the operation of displaying index images in the above embodiment.

First, a desired search item in the search result list 41 is designated using the pointing device (PD) 16 or the typewriter key board (KB) 15 (in the following description, use of the word "designate" means that PD 16 or KB 15 is used). Then, six index images suitable for the designated search item are read and sequentially stored in VRAM 17a, and the image index is displayed (S1). An example of such a display is shown in FIG. 5.

Next, the index image for an objective document is designated among the displayed image index (S2). The designated image is reversed and at the same time, information on the number of pages of the document is obtained from the document management file 21 in the hard disk 13 and is displayed in the guidance area 61b (S3). An example of such a display is shown in FIG. 6.

Next, the number of a page of the document starting from which the index images are displayed is inputted (S4). The inputted page number is compared with the page number information 21b in the document management file 21. If the inputted number is determined to be available (smaller than the page number information), the index image storing positions 31b are read from the designated page of the page management file 31. Using the addresses 31a, the images in the optical disk 12 are read and stored in VRAM 17a to thereafter display six images at a maximum starting from the designated page (S5, S6).

Whether an objective image exists in the displayed images is judged. If not, it is determined if the objective image exists at another page or in another document (S7). If it is determined that the image exists at another page, the page number is again inputted (return to S4).

If it is determined that the image exists in another document, the flow returns to step S1 to display an image index. If an objective image exists at step S7, the image is designated (S8). The designated index image is reversed (this state is shown in FIG. 7), and the real image storing positions 31c of the designated page are read from the page management file 31 to display a real image stored at the designated positions in the optical file 12 (S9). An example of such a display is shown in FIG. 8.

In the above embodiment, six index images are displayed at a maximum starting from the designated page (S4). However, a desired number of images, six at a maximum, may be arranged to be designated, thus realizing more effective search.

Further, after displaying the six index images starting from the designated page, the next six index images may be arranged to be displayed by a single operation. This can be easily realized by adding 5 to the next page address 31d.

Next, another embodiment will be described. Elements having the same structure as that of the above embodiment are designated using identical reference numbers.

Figure 10:
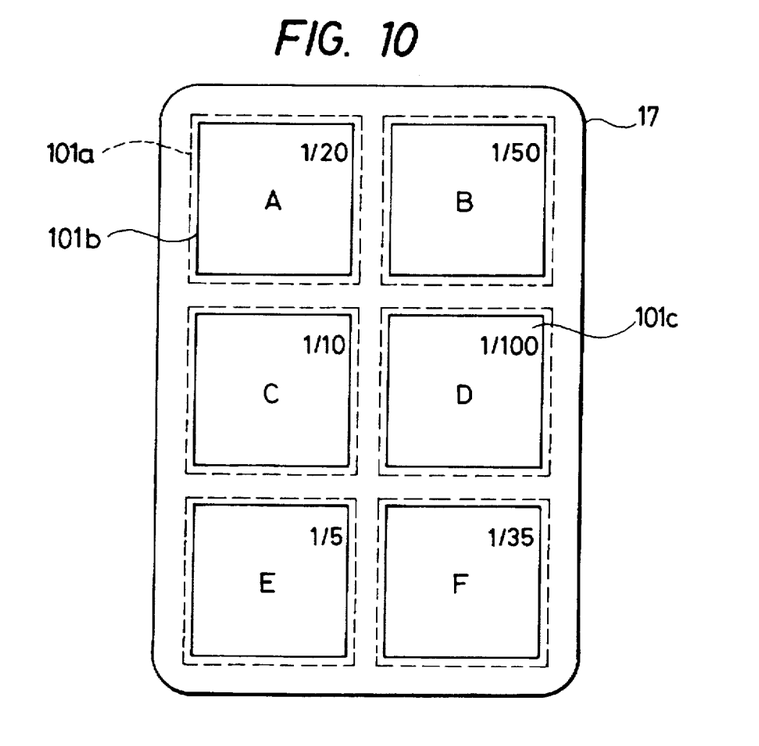
FIGS. 10 to 12 show screen displays used in a second embodiment.

Referring to FIG. 10, an index image is displayed at an index image display area 101a. In this embodiment, six index images at a maximum can be displayed on a display 17. The index information of the first page of a document is displayed at the index image display area 101a. Reference number 101c denotes the displayed page and the total number of pages of the document, i.e., the displayed page being indicated at the left of the slash and the total number at the right of the slash.

Figure 11:
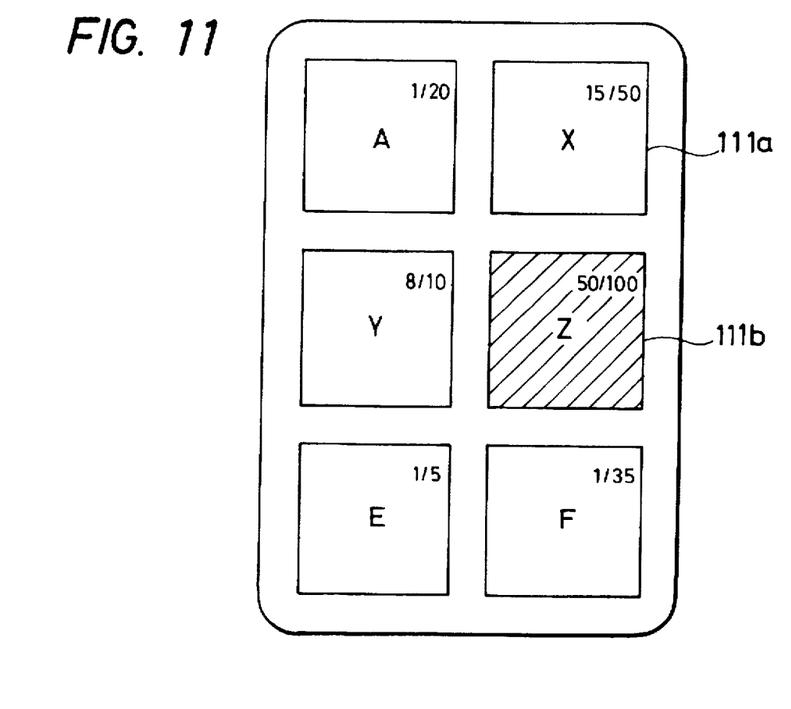
Figure 12:
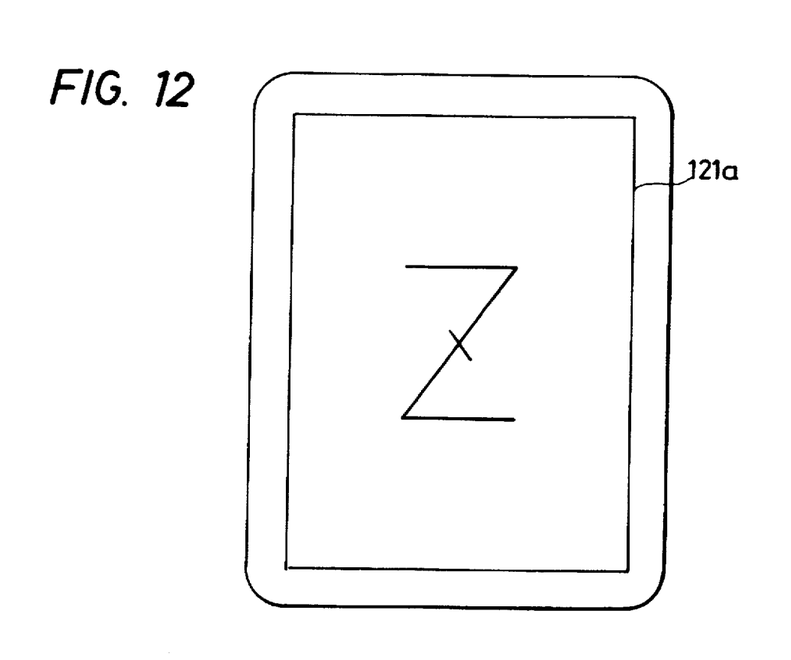

In FIG. 11, an index image 111a of a document at a page other than the first page is shown. A designated reverse index image is shown at 111b. The real image 121a of the designated index image 111b is shown in FIG. 12.

Next, the operation of the above embodiment will be described.

Figure 13:
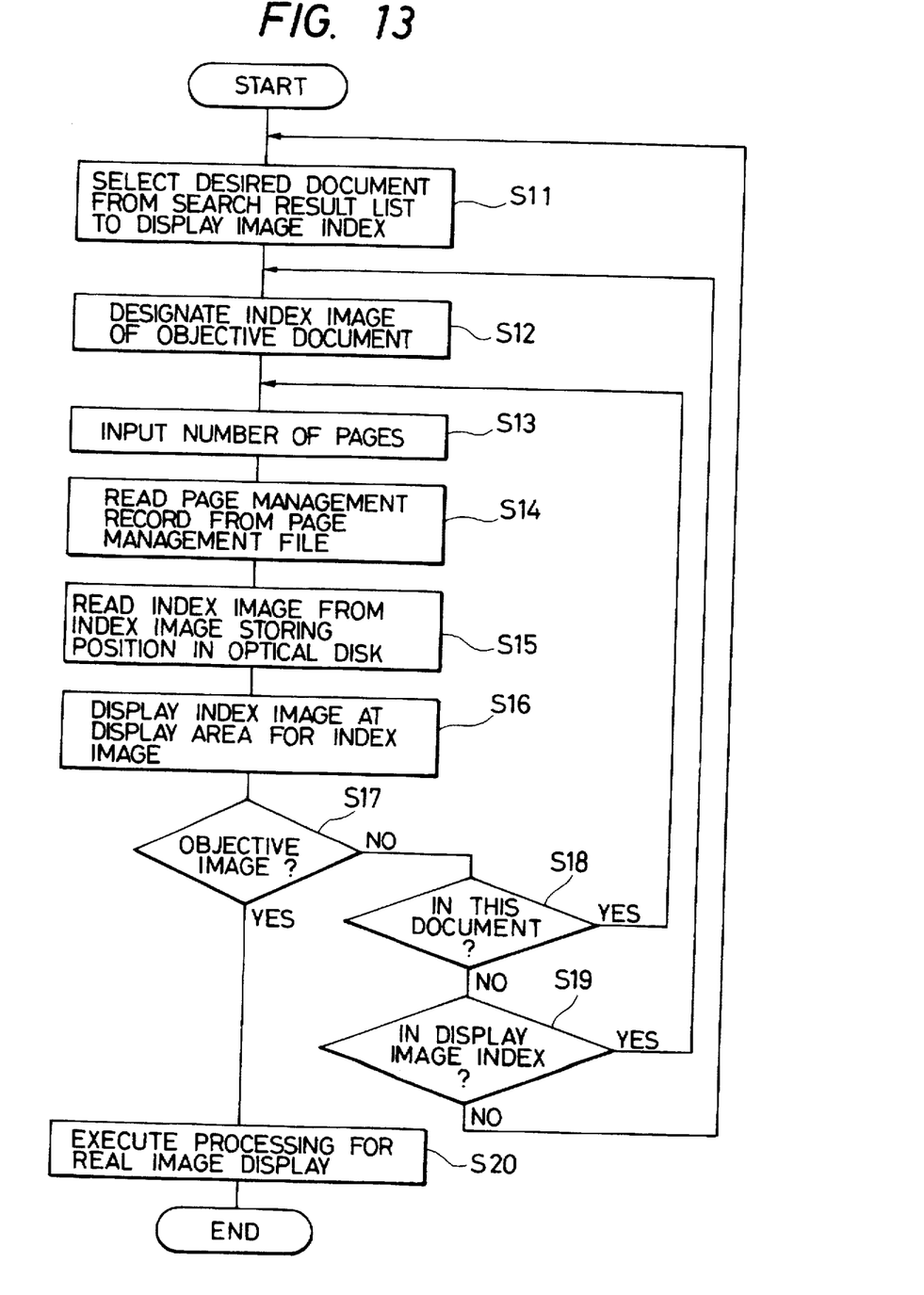
FIG. 13 is a flow chart for explaining the operation of displaying index images.

FIG. 13 is a flow chart illustrating the operation of displaying index images in the above embodiment.

First, desired documents are designated using the search result list 41 and the pointing device 16 or the key board 15, and the six index images of the designated documents are stored in VRAM. Then, an image index is displayed (S11). An image index is an image of a plurality of index images of the first pages of documents displayed on the display 17. In this embodiment, the maximum number of index images which can be displayed is six.

Next, when the index image of an objective document is designated among the image index (S12), the designated image is reversed.

The operator then inputs to the key board 15 what page of the document is to be displayed (S13). If it is considered as an effective input by referring to the page number information 21b in the document management file 21, the page management record of that page is read from the page management file 31 (S14).

Next, an index image in the optical disk is read in accordance with the index image storing positions 31b in the record (S15) to display it at the index image display area 101a (S16). The operator then determines if the displayed image is the objective one (S17). If the operator determines that the objective page is at another page (S18), then another page number is again inputted (S13) to display another index image.

If it is determined at step S18 that an objective page is in another document, it is checked if the document exists in the image index now displayed (S19). If it exists, the operation returns to step S12.

If it is determined at step S19 that an objective document does not exist in the image index now displayed, the flow returns to step S11 to again display another image index.

If it is determined at step S17 that the displayed image is the objective one, it is designated. The designated index image is then reversed and at the same time, the real image storing positions 31c in the page management record of that page are read. Thus, the corresponding image is read from the optical disk to display it on the display (S110).

In the above embodiment, each page of the six index images at a maximum is independently searched. However, it may be possible to designate one page number and display all the six index images at the same page number at once.

By such an arrangement, effective search can be conducted in the case where a page number is known but an objective document is not known.

A still further embodiment will be described. Elements having the same structure as that shown in the above embodiment are designated using identical reference numbers.

Figure 14:
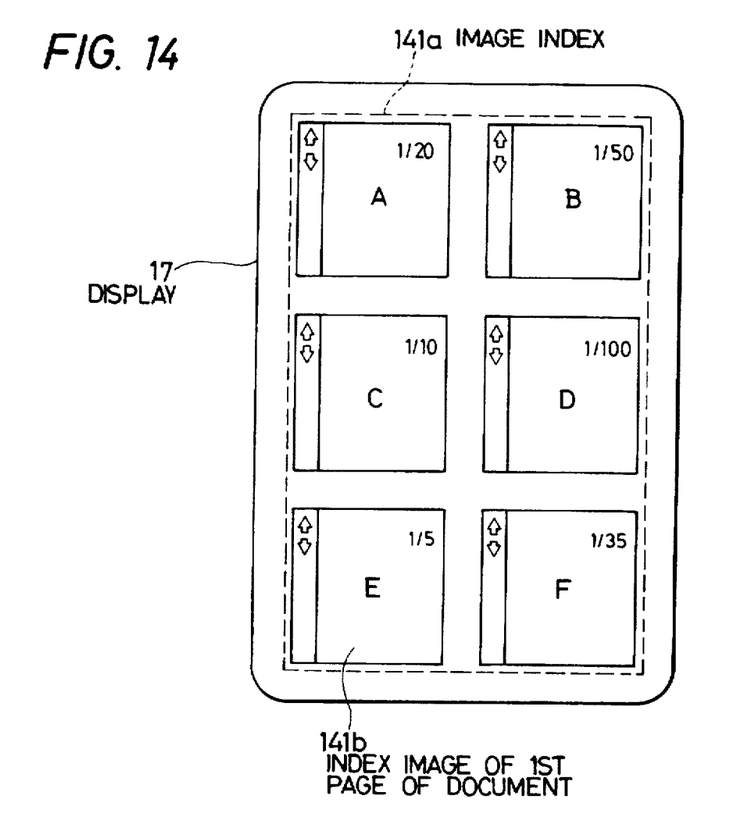
FIGS. 14 to 17 show screen displays used in a third embodiment.

An image index 141a of FIG. 14 shows a plurality of first pages of documents displayed on the display 17. In this embodiment, it is possible to display six index images at a maximum. Reference number 141b represents an index image at the first page of a document.

Figure 15:
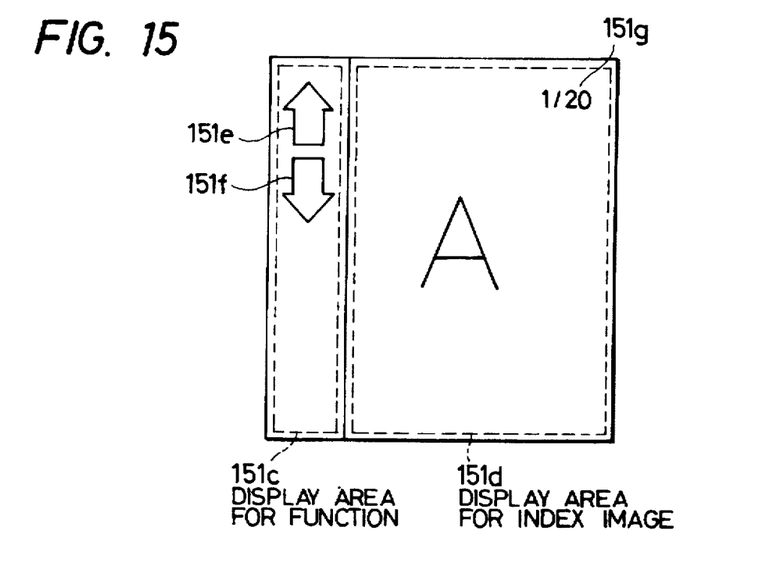

FIG. 15 is an enlarged view of the part of FIG. 14.

An index image selected from the search result is displayed at an index image display area 151a. A previous page-turn function 151e and a next page-turn function 151f are displayed at a function display area 151c. The number shown at the left of the slash at 151g indicates the current page, and that at the right indicates the total page of the document.

Figure 16:
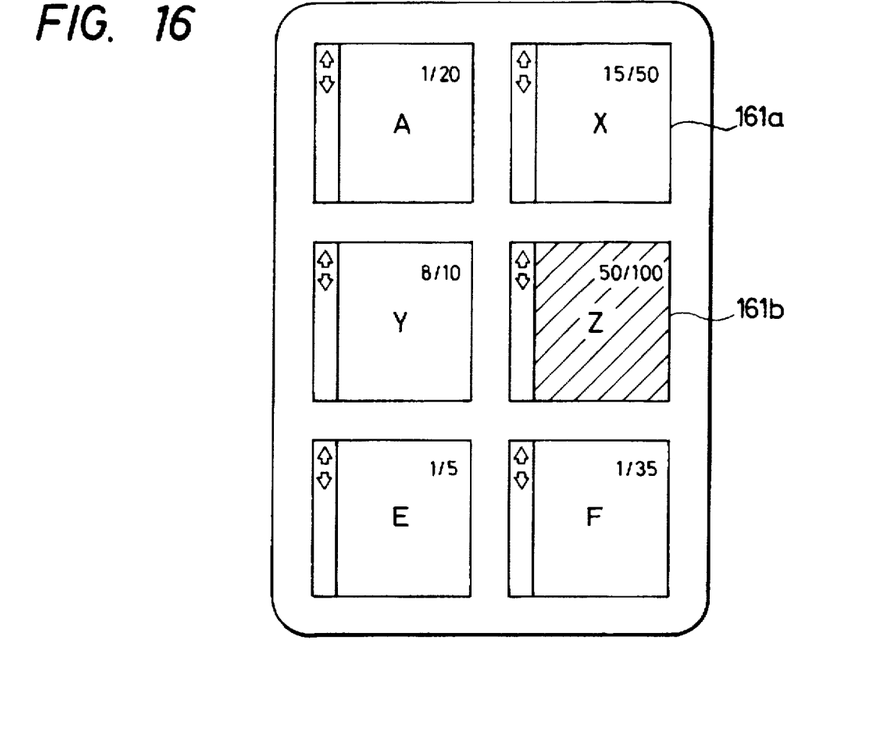
Figure 17:
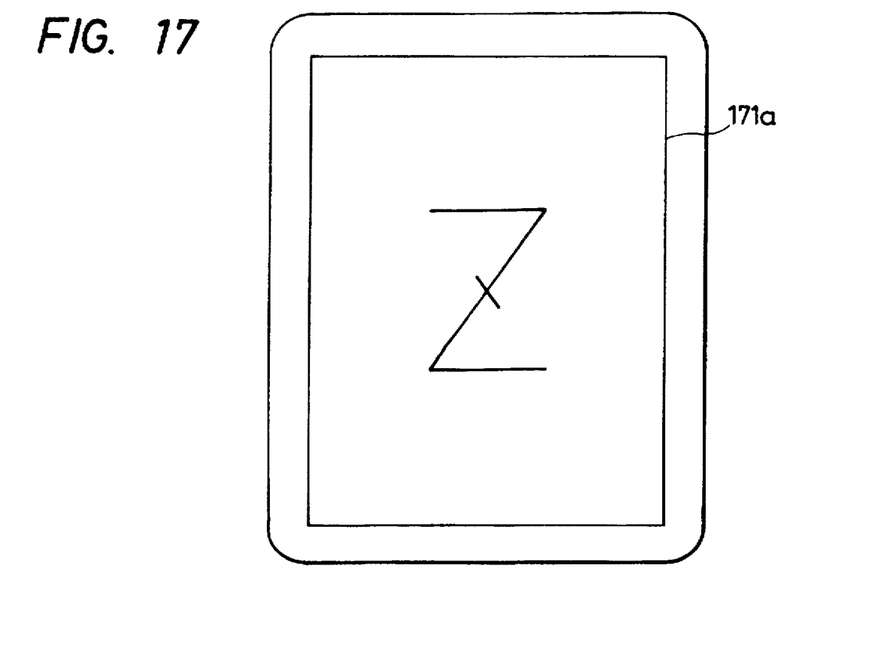

In FIG. 16, an index image 161a at a page other than the first page is shown, and reference number 161b represents a designated reverse index image. Reference number 171a shown in FIG. 17 represents the real image of the designated index image 161b.

Next, the operation of the above embodiment will be described.

Figure 18:
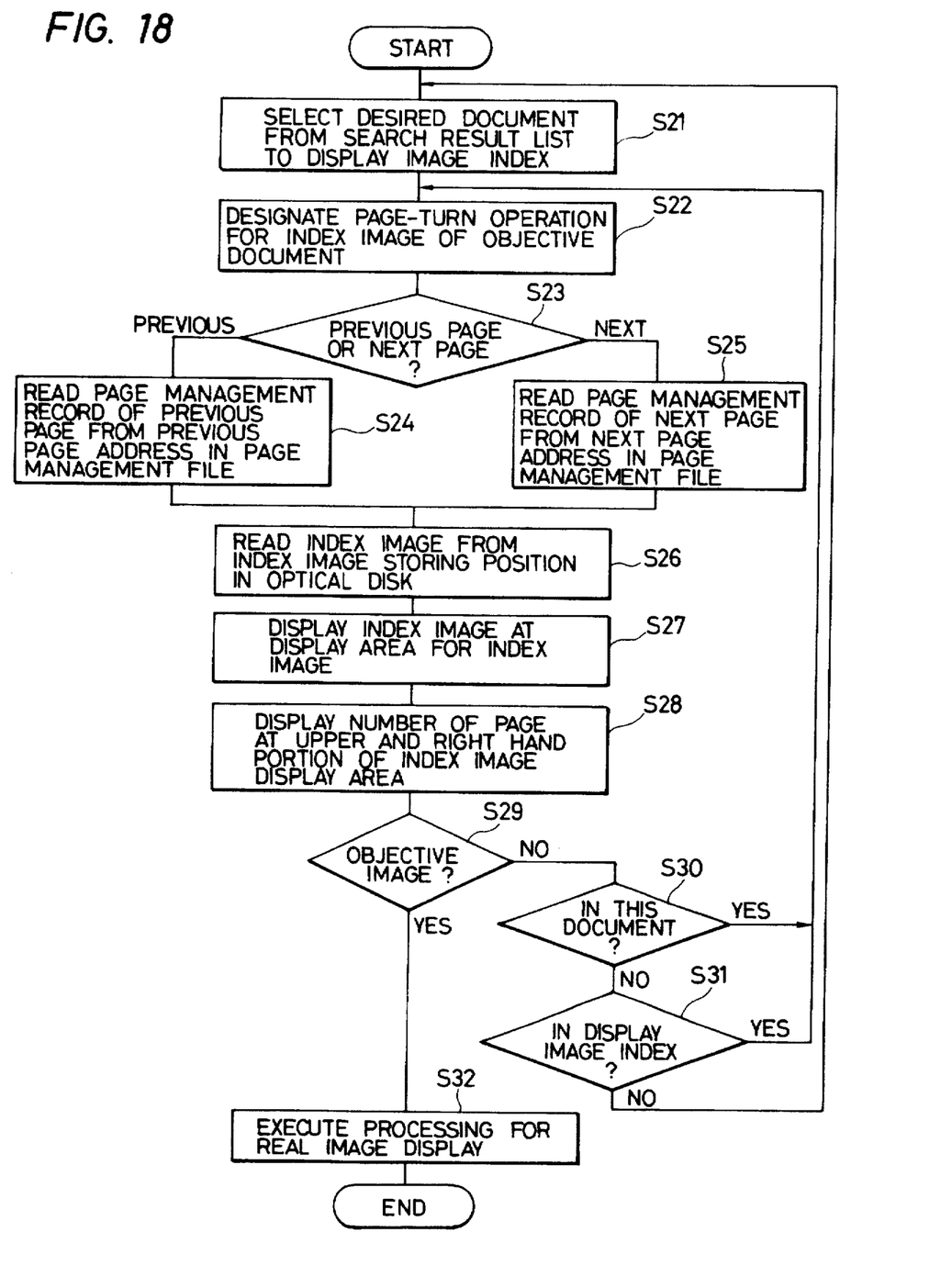
FIG. 18 is a flow chart for explaining the operation of displaying index images.

FIG. 18 is a flow chart illustrating the operation of the above embodiment.

First, objective documents are designated using the search result list and the pointing device 16 or the keyboard 15, and six index images of the first pages of the designated documents are stored in VRAM 17a. An image index is then displayed on the display 17 (S21). Next, the page-turn function 141e or 151f at the left of the index image of the objective document is designated using the pointing device 16 (S22). It is judged if the previous page-turn function 151e or the next page-turn function 151e has been designated (S23). In case of the previous page-turn function 151e, the previous page management record is read from the page management file 31 at the previous page address 31e (S24).

In case of the next page-turn function 151f, the next page management record is read from the page management file 31 at the next page address 31d (S25). Next, an index image is read using the index image storing positions 31b in the page management record (S26) to display it at the index image display area 151d (S27). Simultaneously therewith, the page number displayed at the upper right of the index image display area is decremented by one in case of the previous page-turn, and incremented by one in case of the next page-turn, respectively (S28). If the last page is displayed at that time and the next page-turn is designated, the page is scrolled down back to the first page to display the first page image (with the page number 1 being displayed).

Similarly, if the first page is displayed at that time and the previous page-turn is designated, the page is scrolled up to the last page to display the last page image and the last page number. If a document has only one page, the page-turn functions 151e and 151f are not displayed.

Next, the operator determines if the displayed index image is an objective image (S29). If not, it is judged if an objective image exists in that document (S30) and if affirmative, the page-turn operation for that document continues. If not, it is judged if another document concerned is present in the currently displayed image index (S31). If present, the page-turn operation for the other document is executed.

If it is judged that an objective image is not present in the currently displayed image index (S31), the flow returns to step S21 to again display another image index.

If the displayed image is determined as an objective image (S29), the image is designated and reversed. At the same time, the real image storing positions 31c are read from the page management record of that page to read the corresponding image from the optical disk and display the real image on the display (S32).

In the above embodiment, although downward and upward arrows are used as the symbols of page-turn function, any other symbols or characters may be used so long as the operator can recognize them. Further, the page-turn function may be designated by either the pointing device or the key board.

Also in the above embodiment, the maximum six documents displayed as the index images are independently subjected to page-turn operation to search an objective image. However, the page-turn operation may be collectively applied to all the index images. Particularly, in case of the previous page-turn, the index images are all turned to the previous pages upon designation by the pointing device or the key board. Alternatively, in case of the next page-turn, they are all turned to the next pages.

In the above embodiments, the real image displayed on the display 17 can be outputted onto the printer 18 upon command from the key board 15. In this case, two modes can be selected by the key board, only the displayed page being printed in the one mode and all the pages of the document being printed in the other mode. Such a selection may be effected by pointing icons representative of such modes using the pointing device 16.

In the above embodiments, index images are stored in the optical disk together with the real images. However, index images may be produced by reading the real images from the optical disk and thinning them at the processing section 2.

The present invention is not limited to the above embodiments, but various modifications are possible.

I claim:

1. An image retrieval apparatus for retrieving a desired image from a storage medium which stores a plurality of document files each comprising plural pages of images, comprising:

display means for simultaneously displaying respectively index images of the plurality of document files, the index image of each document file being a part or a reduced image of the image of each page of each document file;

input means for inputting one of a paging-back instructions for changing the displayed index image of one of the plurality of document files to the index images of the previous pages of the same document file and a paging-forward instruction for changing the displayed index image of the one of the plurality of document files to the index images of the next pages of the same document file; and control means for selectively changing the displayed index image of the one of the plurality of document files to the index image of the previous or next page of the same document file according to the paging-back instruction or the paging-forward instruction inputted by said input means, while maintaining the displayed index images of the other document files.

2. An apparatus according to claim 1, wherein said input means is provided for each of the plurality of document files.

3. An apparatus according to claim 1, wherein said input means includes a pointing device for designating a desired position of said display means.

4. An image retrieval apparatus for retrieving a desired image from a storage medium which stores a plurality of document files each comprising plural pages of images, comprising:

display means for simultaneously displaying respectively index images of the plurality of document files, the index image of each document file being a part or a reduced image of the image of each page of each said document file;

designation means for designating one of the index images simultaneously displayed by said display means to select the document file corresponding to the designated index image;

input means for inputting a desired page of the document file selected by said designation means; and control means for changing the simultaneously displayed index images of the document files to the index images of a predetermined number of pages from the desired page, inputted by said input means, of the same document file selected.

5. An apparatus according to claim 4, wherein said designation means includes a pointing device for designating a desired position of said display means.

6. An apparatus according to claim 4, further comprising second designating means for designating one of the index images of the same document file simultaneously displayed by said display means to select an original image of the designated index image, and wherein said control means changes the index images simultaneously displayed by said display means to the original image selected by said second designation means to display said original image.

7. An apparatus according to claim 4, wherein said display means further displays the total number of pages of the document file by said designation means.

8. An apparatus according to claim 4, wherein said display means further displays the page number of the index image displayed by said display means.

9. An image retrieval apparatus for retrieving a desired image from a storage medium which stores a plurality of document files each comprising a plurality of pages of images, comprising:

display means for simultaneously displaying respectively index images of the plurality of document files, the index image of each document file being part or a reduced image of the image of each page of each said document file;

designation means for designating one of the index images simultaneously displayed by said display means to select the document file corresponding to the designated index image;

input means for inputting a desired page of the document file selected by said designation means; and control means for changing the displayed index image of the document file selected by said designation means to the index image of the desired page inputted by said input means, of the same document file, to display the index image of the desired page of the same document file, while maintaining the displayed index images of the other document files.

10. An apparatus according to claim 9, wherein said control means changes the displayed index image of the selected document file to the index image of the desired page with the index images of the document files which have not been selected by said designation means being displayed unchanged.

11. An apparatus according to claim 9, wherein said designation means includes a pointing device for designating a desired position of said display means.

12. An apparatus according to claim 9, further comprising second designation means for designating the index image of the index images simultaneously displayed by said display means to select an original image of the designated index image, and wherein said control means changes the index images simultaneously displayed by said display means to the original image selected by said second designation means to display the original image.

13. An apparatus according to claim 9, wherein said display means further displays the total number of pages of the document file selected by said designating means.

14. An apparatus according to claim 9, wherein said display means further displays the page number of the index image displayed by said display means.

15. An image retrieval method for retrieving a desired image from a storage medium which stores a plurality of document files each comprising a plurality of pages of images, comprising the steps of:

(a) simultaneously displaying respectively index images of a plurality of document files on a display, the index image of each document file being a part or a reduced image of the image of each page of each said document file;

(b) inputting one of a paging-back instruction for changing the displayed index image of one of the plurality of document files to the index images of the next pages of the same document file; and (c) selectively changing the displayed index image of the one of the plurality of document files to the index image of the previous or next page of the same document file according to the input paging-back instruction or paging-forward instruction, while maintaining the displayed index images of the other document files.

16. An image retrieval method for retrieving a desired image from a storage medium which stores a plurality of document files each comprising a plurality of pages of images, comprising the steps of:

(a) simultaneously displaying respectively index images of the plurality of document files on a display, the index image of each document file being a part or a reduced image of the image of each page of each said document file;

(b) designating one of the index images simultaneously displayed by the display to select the document file corresponding to the designated index image;

(c) inputting a desired page of the selected document file; and (d) changing the simultaneously displayed index images of the document files to the index images of a predetermined number of pages from the input desired page of the same document file selected.

17. A method according to claim 16, further comprising the steps of:

(a) designating an index image of the index images simultaneously displayed on the display to select an original image of the designated index image; and (b) changing the simultaneously displayed index images displayed on the selected original image to display the original image.

18. An image retrieval method for retrieving a desired image from a storage medium which stores a plurality of document files each comprising a plurality of pages of images, comprising the steps of:

(a) simultaneously displaying respectively index images of the plurality of document files on a display, the index image of each document file being a part or a reduced image of the image of each document file;

(b) designating one of the index images simultaneously displayed by the display to select the document file corresponding to the designated index image;

(c) inputting a designated page of the document file; and (d) changing the displayed index image of the selected document file to the index image of the input page to display the index image of the desired page of the same document file, while maintaining the displayed index images of the other document files.

19. A method according to claim 18, further comprising the steps of:

(a) designating the index image or the index images simultaneously displayed on the display to select an original image of the designated index image; and (b) changing the simultaneously displayed index images displayed on the selected original image to display the original image.

* * * * *

UNITED STATES PATENT AND TRADEMARK OFFICE
CERTIFICATE OF CORRECTION

PATENT NO. : 5,781,175

DATED : July 14, 1998

INVENTOR(S) : Hara

It is certified that error appears in the above-identified patent and that said Letters Patent is hereby corrected as shown below:

COLUMN 6:

Line 45, "tions" should read --tion--.

COLUMN 7:

Line 30, "by" should read --selected by--.

Signed and Sealed this

Twenty-seventh Day of July, 1999

Attest:

Q. TODD DICKINSON

Attesting Officer     Acting Commissioner of Patents and Trademarks